United States Patent [19]
Hamann

[11] Patent Number: 5,553,804
[45] Date of Patent: Sep. 10, 1996

[54] SEAT BELT RETRACTOR WITH A CINCH MECHANISM

[75] Inventor: Russell E. Hamann, Rochester Hills, Mich.

[73] Assignee: TRW Vehicle Safety Systems Inc., Lyndhurst, Ohio

[21] Appl. No.: 405,880

[22] Filed: Mar. 17, 1995

[51] Int. Cl.$^6$ .................... B60R 22/343; B60R 22/353
[52] U.S. Cl. .......................... 242/382.4; 280/807
[58] Field of Search ................... 242/382, 382.1, 242/382.2, 382.3, 382.4, 383, 384; 297/477, 475, 476, 478; 280/806, 807; 180/268, 271, 286

[56] References Cited

U.S. PATENT DOCUMENTS

| | | |
|---|---|---|
| 3,866,854 | 2/1975 | Wehner ......................... 242/382.1 |
| 3,967,794 | 7/1976 | Fohl . |
| 4,519,652 | 5/1985 | Kamijo . |
| 4,566,649 | 1/1986 | Petersen, III . |
| 4,678,134 | 7/1987 | Ameur . |
| 4,895,317 | 1/1990 | Rumpf et al. . |

FOREIGN PATENT DOCUMENTS 2035758  1/1972  Germany ....................... 297/477
2347679  9/1974  Germany ....................... 297/477

*Primary Examiner*—John M. Jillions
*Attorney, Agent, or Firm*—Tarolli, Sundheim, Covell, Tummino & Szabo

[57] ABSTRACT

A seat belt retractor (10) comprises a rotatable spool (16) with seat belt webbing (18) wound around the spool. The spool (16) has a longitudinal central axis and is rotatable in a belt unwinding direction (20) about its longitudinal central axis to enable the seat belt webbing (18) to be extended about a vehicle occupant. An actuatable locking mechanism (60), when actuated, prevents the spool (16) from rotating in the belt unwinding direction (20). A toothed wheel (24) is rotatable with the spool (16) about the longitudinal central axis of the spool. The toothed wheel (24) includes at least one coded tooth (26') comprising magnetic material. A pair of magnetic sensors (30, 35) cooperates to sense rotation of the coded tooth (26') about the longitudinal central axis of the spool (16). The locking mechanism (60) actuates to prevent the spool (16) from rotating in the belt unwinding direction (20) when the magnetic sensors (30, 35) provide signals indicating that the coded tooth (26') and the spool have rotated a predetermined number of revolutions in the belt unwinding direction.

18 Claims, 1 Drawing Sheet

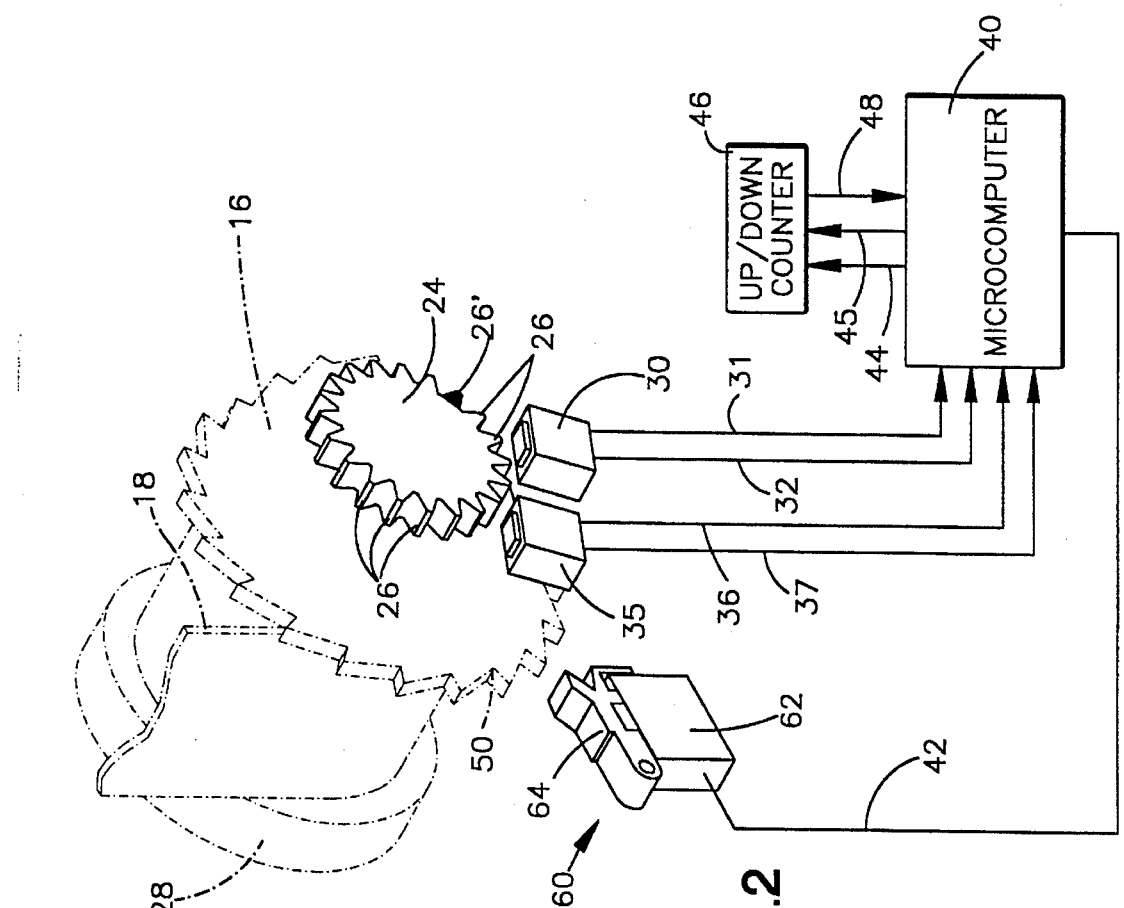
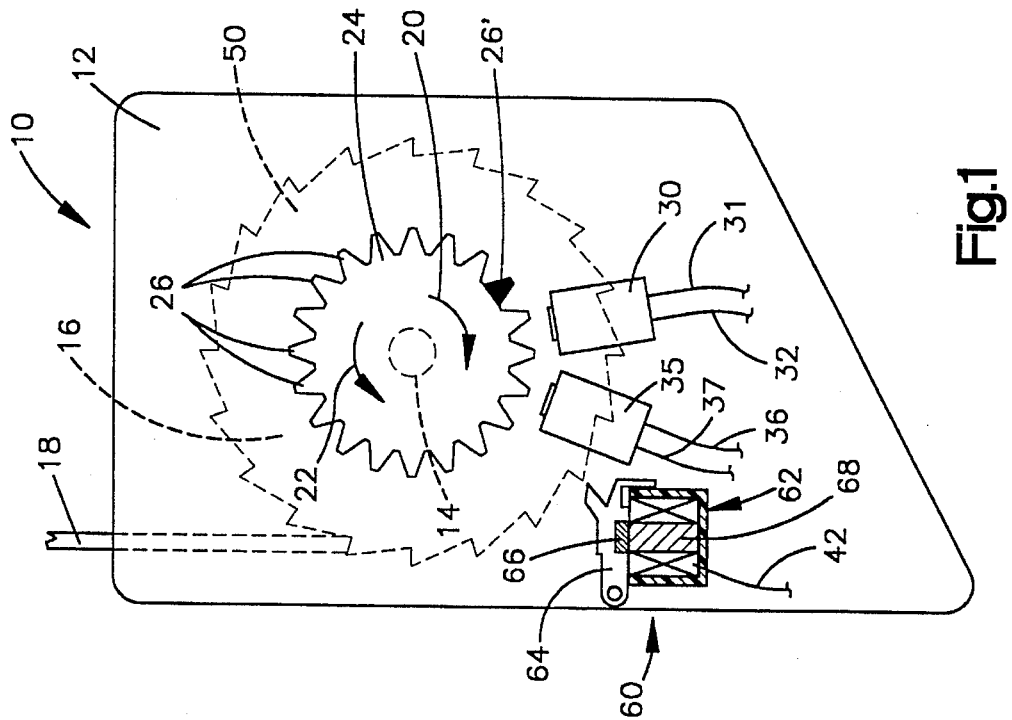

SEAT BELT RETRACTOR WITH A CINCH MECHANISM

BACKGROUND OF THE INVENTION

1. Technical Field

The present invention relates to a vehicle seat belt retractor for use in a vehicle occupant restraint system, and is particularly directed to a seat belt retractor with a cinch mechanism which blocks rotation of a seat belt storage spool in a seat belt withdrawal direction in response to withdrawal of a predetermined amount of seat belt from the spool.

2. Background Art

A typical seat belt retractor includes a rotatable spool with seat belt webbing wound around the spool. The spool has a longitudinal central axis and is rotatable in a seat belt unwinding direction about its longitudinal central axis to enable the belt webbing to be extended about a vehicle occupant.

A typical cinch mechanism includes an actuatable locking mechanism which, when actuated, locks the spool from rotation in the belt unwinding direction. The locking mechanism actuates to lock the spool when the belt webbing has been unwound at least a predetermined amount from the spool. When the spool is locked from rotation in the belt unwinding direction, the belt webbing is cinched and thus unable to move in the belt unwinding direction.

When the belt webbing is cinched, the belt webbing can move only in the belt winding direction onto the spool. Typically, the belt webbing is unable to move in the belt unwinding direction until the belt webbing is returned to a fully wound condition on the spool. When the belt webbing is returned to the fully wound condition on the spool, the locking mechanism is actuated to release the spool for rotation in the belt unwinding direction.

SUMMARY OF THE INVENTION

In accordance with the present invention, a seat belt retractor comprises a rotatable spool with seat belt webbing wound around the spool. The spool has a longitudinal central axis and is rotatable in a belt unwinding direction about its longitudinal central axis to enable the belt webbing to be extended about a vehicle occupant. Actuatable locking means is provided for, when actuated, preventing the spool from rotating in the belt unwinding direction about its longitudinal central axis. Sensing means is provided for sensing rotation of a means for rotating in response to rotation of the spool about its longitudinal central axis. Means is provided for actuating the locking means to prevent the spool from rotating in the belt unwinding direction about its longitudinal central axis when the sensing means senses that the means for rotating in response to rotation of the spool has rotated a predetermined number of revolutions in the belt unwinding direction about its longitudinal central axis.

Preferably, the means for rotating in response to rotation of the spool is disposed on the spool for triggering the sensing means. The means disposed on the spool comprises a toothed wheel including at least one coded tooth comprising magnetic material. The sensing means is, preferably, a magnetic sensing means. The magnetic sensing means includes (i) first magnetic sensing means for generating a first signal indicative of when the coded tooth passes by the first magnetic sensing means and (ii) second magnetic sensing means for generating a second signal indicative of when the coded tooth passes by the second magnetic sensing means. The first magnetic sensing means generates the first signal before the second magnetic sensing means generates the second signal when the coded tooth and the spool rotate in the belt unwinding direction. The second magnetic sensing means generates the second signal before the first magnetic sensing means generates the first signal when the coded tooth and the spool rotate in the belt winding direction.

The means for actuating the locking means applies a signal to a counter to increment the counter when the first magnetic sensing means generates the first signal before the second magnetic sensing means generates the second signal. The actuating means applies a signal to the counter to decrement the counter when the second magnetic sensing means generates the second signal before the first magnetic sensing means generates the first signal. Accordingly, the counter increments when the spool rotates in the belt unwinding direction and decrements when the spool rotates in the belt winding direction. When the counter reaches a predetermined count, the counter sends a signal to the actuating means to actuate the locking means to prevent the spool from rotating in the belt unwinding direction.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is an elevational view of a seat belt retractor embodying the present invention; and FIG. 2 is a schematic block diagram illustrating the seat belt retractor of FIG. 1.

DESCRIPTION OF A PREFERRED EMBODIMENT

As illustrated in FIG. 1, a seat belt retractor 10 comprises a frame 12 and a shaft 14 rotatably supported at its opposite ends by the frame 12. The seat belt retractor 10 further comprises a retractor spool 16 having seat belt webbing 18 wound around the spool 16. The spool 16 is fixedly connected to the shaft 14 and has a longitudinal central axis which coincides with the longitudinal central axis of the shaft 14. The spool 16 and the shaft 14 are supported for rotation about their longitudinal central axes by the frame 12 of the seat belt retractor 10.

The seat belt webbing 18 is movable in a belt unwinding direction 20 or in a belt winding direction 22 onto the spool 16. A wind-up spring (not shown) is connected between one end of the spool 16 and a spring housing 28 fixed to the frame 12 of the seat belt retractor 10. The wind-up spring biases the spool 16 to rotate in the belt winding direction 22 onto the spool 16.

The direction of rotation of the spool 16 and the shaft 14 depends upon the direction of movement of the seat belt webbing 18. When the seat belt webbing 18 moves in the belt unwinding direction 20, the spool 16 and the shaft 14 rotate together in one direction, clockwise, as viewed in FIG. 1, about their longitudinal central axes. When the seat belt webbing 18 moves in the belt winding direction 22, the spool 16 and the shaft 14 rotate together in the other direction, counterclockwise, as viewed in FIG. 1, about their longitudinal central axes.

A ratchet wheel 50 is connected at the end of the spool 16 opposite from the wind-up spring in a known manner. A cinch mechanism 60 (FIG. 2) comprises an electrically actuatable mechanism, such as electromagnet 62, and a lever arm 64 which is movable into engagement with a tooth of the ratchet wheel 50. The lever arm 64 moves into engagement with a tooth of the ratchet wheel 50 when the electromagnet 62 is actuated. When the lever arm 64 engages a tooth of the ratchet wheel 50, the spool 16 is locked and cannot rotate in the belt unwinding direction 20. Thus, the spool 16 is prevented from rotation in the belt unwinding direction 20 upon actuation of the electromagnet 62.

The lever arm 64 is made of a material which is nonmagnetizeable, such as nylon. A permanent magnet 66 is fixed to the lever arm 64 in a suitable manner. The electromagnet 62 includes wire coils wound around a core 68 which is preferably ferrous. When the electromagnet is deenergized, the permanent magnet 66 is magnetically attracted to the core 68 which holds the lever arm 64 away from engagement with the ratchet wheel 50. Upon energization of the electromagnet 62, the magnetic polarity at the end of the core 68 adjacent the permanent magnet 66 repels the permanent magnet causing the lever arm 64 to pivot into engagement with the ratchet wheel 50.

The teeth of the ratchet wheel 50 are inclined to permit rotation of the ratchet wheel and the spool 16 in the belt winding direction 22 when the lever arm 64 engages the ratchet wheel. The teeth of the ratchet wheel 50 pass under the lever arm 64 while the lever arm engages the ratchet wheel and the ratchet wheel rotates in the belt winding direction 22. The lever arm 64 pivots against the repelling force between the electromagnet 62 and the permanent magnet 66 when the teeth of the ratchet wheel 50 pass under the lever arm. Accordingly, the ratchet wheel 50 and the spool 16 can rotate in the belt winding direction 22 under the influence of the wind-up spring while the lever arm 64 prevents rotation of the ratchet wheel and the spool in the belt unwinding direction 20.

A toothed wheel 24 is fixedly mounted on the end of the shaft 14 adjacent the ratchet wheel 50. The toothed wheel 24 is rotatable together with the spool 16 and the shaft 14 about the longitudinal axes of the spool 16 and the shaft 14. The toothed wheel 24 includes a plurality of teeth 26 which are disposed equidistantly apart from each other around the outer periphery of the toothed wheel 24. At least one of the teeth 26 is coded. As illustrated in FIG. 1, the coded tooth is designated with reference numeral 26'. The tooth 26' is coded in that it is made of magnetic material of high magnetic permeability.

Referring to FIGS. 1 and 2, first and second magnetic sensors 30, 35 are disposed around the periphery of the toothed wheel 24. The first and second magnetic sensors 30, 35 are adjacent to each other. Each of the magnetic sensors 30, 35 is fixedly mounted to a part (not shown) of the vehicle. Each of the magnetic sensors 30, 35 has its own respective magnetic field. When the magnetic field associated with the first magnetic sensor 30 changes at least a predetermined amount, the first magnetic sensor 30 provides a signal on line 31 indicative of the change. Similarly, when the magnetic field associated with the second magnetic sensor 35 changes at least a predetermined amount, the second magnetic sensor 35 provides a signal on line 36 indicative of the change.

When the belt webbing 18 moves in the belt unwinding direction 20, the coded tooth 26' passes by the first magnetic sensor 30 and then passes by the second magnetic sensor 35 upon each revolution of the toothed wheel 24 about its center. As the coded tooth 26' passes by the first magnetic sensor 30, the magnetic field associated with the first magnetic sensor 30 changes. Also, as the coded tooth 26' passes by the second magnetic sensor 35, the magnetic field associated with the second magnetic sensor 35 changes. Since the coded tooth 26' passes by the first magnetic sensor 30 before it passes by the second magnetic sensor 35, the magnetic field associated with the first magnetic sensor 30 changes before the magnetic field associated with the second magnetic sensor 35 changes.

When the belt webbing 18 moves in the belt winding direction 22, the coded tooth 26' passes by the second magnetic sensor 35 and then passes by the first magnetic sensor 30 upon each revolution of the toothed wheel 24 about its center. As the coded tooth 26' passes by the second magnetic sensor 35, the magnetic field associated with the second magnetic sensor 35 changes. Also, as the coded tooth 26' passes by the first magnetic sensor 30, the magnetic field associated with the first magnetic sensor 30 changes. Since the coded tooth 26' passes by the second magnetic sensor 35 before it passes by the first magnetic sensor 30, the magnetic field associated with the second magnetic sensor 35 changes before the magnetic field associated with the first magnetic sensor 30 changes.

A microcomputer 40 monitors the signal on line 31 from the first magnetic sensor 30 and the signal on line 36 from the second magnetic sensor 35. The microcomputer 40 generates control signals on lines 44 and 45 to be applied to an up/down counter 46 in response to the signals on lines 31 and 36. The control signals on lines 44 and 45 are generated in accordance with a preprogrammed procedure stored in an internal memory of the microcomputer 40. Microcomputers are readily available in the commercial market. Their internal structure and operation are well known in the art and, therefore, the microcomputer 40 will not be described in detail herein.

More specifically, when the microcomputer 40 detects that the first magnetic sensor 30 provided the signal on line 31 before the second magnetic sensor 35 provided the signal on line 36, the microcomputer 40 provides a trigger signal on line 44 to indicate that the toothed wheel 24 and thus the spool 16 has rotated in the belt unwinding direction 20. The signal on line 44 is applied to the up/down counter 46 to increment the up/down counter 46. When the microcomputer 40 detects that the second magnetic sensor 35 provided the signal on line 35 before the first magnetic sensor 30 provided the signal on line 31, the microcomputer 40 provides a trigger signal on line 45 to indicate that toothed wheel 24 and thus the spool 16 has rotated in the belt winding direction 22. The signal on line 45 is applied to the up/down counter 46 to decrement the up/down counter 46. Thus, the counter 46 increments (counts up) when the spool 16 has rotated in the belt unwinding direction 20, and decrements (counts down) when the spool 16 has rotated in the belt winding direction 22.

The actual count of the counter 46 is indicative of the number of revolutions the toothed wheel 24 has made in the belt unwinding direction 20. Thus, the actual count of the counter 46 is indicative of the amount of seat belt webbing unwound from the spool 16. When the count of the counter 46 reaches a predetermined count in the up-count direction, the counter 46 provides an enabling signal on line 48. When the microcomputer 40 detects that the counter 46 has provided the enabling signal on line 48, the microcomputer 40 provides a control signal on line 42 to actuate the electromagnet 62 to move the lever arm 64 into engagement with a tooth of the ratchet wheel 50. The seat belt webbing 18 is cinched and thus unable to move in the belt unwinding direction 20, as is known.

The spool 16 remains unable to rotate in the belt unwinding direction 20 until after the seat belt webbing 18 has been returned to a fully wound condition on the spool 16. More specifically, as the seat belt webbing 18 returns to the fully wound condition on the spool 16, the spool 16 rotates in the belt winding direction 22 and the counter 46 decrements (counts down). The counter 46 continues decrementing until a predetermined count which is indicative of the seat belt webbing 18 being in the fully wound condition is reached. When this occurs, the microcomputer 40 causes the electromagnet 62 to allow the lever arm 64 to move out of engagement with the ratchet wheel 50. The spool 16 and thus the seat belt webbing 18 are again able to rotate in the belt unwinding direction 20.

From the above description of the invention, those skilled in the art to which the present invention relates will perceive improvements, changes and modifications. Such improvements, changes and modifications within the skill of the art are intended to be covered by the appended claims.

Having described the invention, the following is claimed:

1. A seat belt retractor for use by an occupant of a vehicle, said seat belt retractor comprising:

a rotatable spool with seat belt webbing wound around said spool, said spool having a longitudinal central axis and being rotatable in a belt unwinding direction about its longitudinal central axis to enable the belt webbing to be extended about the occupant;

actuatable locking means for, when actuated, preventing said spool from rotating in the belt unwinding direction about its longitudinal central axis;

means for rotating in response to rotation of said spool about its longitudinal central axis;

sensing means for sensing rotation of said means for rotating in response to rotation of said spool, said sensing means including means for generating at least one signal indicative of said means for rotating in response to rotation of said spool passing by said sensing means as said means for rotating, in response to rotation of said spool, rotates; and means for actuating said locking means to prevent said spool from rotating in the belt unwinding direction about its longitudinal central axis when said sensing means senses that said means for rotating in response to rotation of said spool has rotated a predetermined number of revolutions in the belt unwinding direction.

2. A seat belt retractor according to claim 1 further comprising a shaft extending along the longitudinal central axis of said spool and fixedly connected with said spool to rotate together with said spool about the longitudinal central axis, said means for rotating in response to rotation of said spool being fixedly mounted on said shaft to rotate with said shaft and said spool about the longitudinal central axis of said spool.

3. A seat belt retractor according to claim 1 wherein said actuating means includes a microcomputer which monitors said at least one signal from said sensing means.

4. A seat belt retractor according to claim 3 wherein said sensing means includes (i) first sensing means for generating a first signal indicative of when said means for rotating in response to rotation of said spool passes by said first sensing means and (ii) second sensing means for generating a second signal indicative of when said means for rotating in response to rotation of said spool passes by said second sensing means, said first sensing means generating said first signal before said second sensing means generates said second signal when said spool rotates in the belt unwinding direction, said second sensing means generating said second signal before said first sensing means generates said first signal when said spool rotates in a belt winding direction.

5. A seat belt retractor according to claim 4 wherein said actuating means includes an up/down counter which counts in one direction when said microcomputer determines that said first signal is provided before said second signal and counts in the other direction when said microcomputer determines that said second signal is provided before said first signal, the count of said up/down counter in one direction corresponding with the number of revolutions that said means for rotating in response to rotation of said spool has rotated in the belt unwinding direction.

6. A seat belt retractor for use by an occupant of a vehicle, said seat belt retractor comprising:

a rotatable spool with seat belt webbing wound around said spool, said spool having a longitudinal central axis and being rotatable in a belt unwinding direction about its longitudinal central axis to enable the belt webbing to be extended about the occupant;

actuatable locking means for, when actuated, preventing said spool from rotating in the belt unwinding direction about its longitudinal central axis;

a toothed wheel rotatable with said spool about its longitudinal central axis, said toothed wheel including at least one coded tooth comprising magnetic material;

sensing means for sensing rotation of said coded tooth about the longitudinal central axis of said spool; and means for actuating said locking means to prevent said spool from rotation in the belt unwinding direction about its longitudinal central axis when said sensing means senses that said coded tooth and said spool have rotated a predetermined number of revolutions in the belt unwinding direction about its longitudinal central axis.

7. A seat belt retractor according to claim 6 wherein said magnetic material of said coded tooth has a high magnetic permeability.

8. A seat belt retractor according to claim 6 further comprising a shaft extending along the longitudinal central axis of said spool and fixedly connected with said spool to rotate together with said spool about the longitudinal central axis, said toothed wheel being fixedly mounted on said shaft to rotate with said shaft and said spool about the longitudinal central axis of said spool.

9. A seat belt retractor according to claim 6 wherein said sensing means includes means for generating at least one signal indicative of said coded tooth passing by said sensing means as said coded tooth and said spool rotate about the longitudinal central axis of said spool.

10. A seat belt retractor according to claim 9 wherein said actuating means includes a microcomputer which monitors said at least one signal from said sensing means.

11. A seat belt retractor according to claim 10 wherein said sensing means includes (i) first magnetic sensing means for generating a first signal indicative of when said coded tooth passes by said first magnetic sensing means and (ii) second magnetic sensing means for generating a second signal indicative of when said coded tooth passes by said second magnetic sensing means, said first magnetic sensing means generating said first signal before said second magnetic sensing means generates said second signal when said spool rotates in the belt unwinding direction, said second magnetic sensing means generating said second signal before said first magnetic sensing means generates said first signal when said spool rotates in a belt winding direction.

12. A seat belt retractor according to claim 11 wherein said actuating means includes an up/down counter which counts in one direction when said microcomputer determines that said first signal is provided before said second signal and counts in the other direction when said microcomputer determines that said second signal is provided before said first signal, the count of said up/down counter in one direction corresponding with the number of revolutions that said coded tooth and said spool have rotated about the longitudinal central axis of said spool in the belt unwinding direction.

13. A seat belt retractor for use by an occupant of a vehicle, said seat belt retractor comprising:

a rotatable spool with seat belt webbing wound around said spool, said spool being rotatable in a belt unwinding direction about its longitudinal central axis to enable the belt webbing to be extended about the occupant and rotatable in a belt winding direction opposite the belt unwinding direction;

actuatable locking means for preventing said spool from rotating in the belt unwinding direction;

means for sensing rotation of said spool in the belt unwinding direction;

means for counting the number of revolutions of said spool in the belt unwinding direction; and means for actuating said locking means to prevent said spool from rotating in the belt unwinding direction in response to said sensing means sensing a predetermined number of revolutions of said spool in the unwinding direction;

said sensing means including a first sensor for producing a first signal in response to rotation of said spool and a second sensor for producing a second signal in response to rotation of said spool, said first sensor producing said first signal prior to said second sensor producing said second signal upon rotation of said spool in the unwinding direction, said second sensor producing said second signal prior to said first sensor producing said first signal upon rotation of said spool in the belt winding direction.

14. A seat belt retractor as set forth in claim 13 wherein said sensing means includes a member connected to said spool for rotation along with said spool, said first and second sensors being located adjacent said member for sensing rotation of said member.

15. A seat belt retractor as set forth in claim 14 wherein said member comprises a toothed wheel having at least one coded tooth, said first and second sensors sensing movement of said coded tooth past said sensors.

16. A seat belt retractor for use by an occupant of a vehicle, said seat belt retractor comprising:

a rotatable spool with seat belt webbing wound around said spool, said spool being rotatable in a belt unwinding direction about its longitudinal central axis to enable the belt webbing to be extended about the occupant and rotatable in a belt winding direction opposite the belt unwinding direction;

actuatable locking means for preventing said spool from rotating in the belt unwinding direction;

means for sensing rotation of said spool in the belt unwinding direction, said sensing means sensing the direction of rotation of said spool;

means for counting the number of revolutions of said spool in the belt unwinding direction; and means for actuating said locking means to prevent said spool from rotating in the belt unwinding direction in response to said sensing means sensing a predetermined number of revolutions of said spool in the unwinding direction.

17. A seat belt retractor as set forth in claim 16 wherein said counting means includes means for incrementing the number of revolutions of said spool in the unwinding direction in response to rotation of said spool in the unwinding direction and means for decrementing the number of revolutions of said spool in the belt unwinding direction in response to rotation of said spool in the belt winding direction.

18. A seat belt retractor for use by an occupant of a vehicle, said seat belt retractor comprising:

a rotatable spool with seat belt webbing wound around said spool, said spool being rotatable in a belt unwinding direction about its longitudinal central axis to enable the belt webbing to be extended about the occupant and rotatable in a belt winding direction opposite the belt unwinding direction;

actuatable locking means for preventing said spool from rotating in the belt unwinding direction;

means for sensing rotation of said spool in the belt unwinding direction;

means for counting the number of revolutions of said spool in the belt unwinding direction; and means for actuating said locking means to prevent said spool from rotating in the belt unwinding direction in response to said sensing means sensing a predetermined number of revolutions of said spool in the unwinding direction;

said locking means including a lever arm, a ratchet wheel connected with said spool, and an electrically actuatable mechanism for moving said lever arm into engagement with said ratchet wheel, said sensing means including means for sending a first signal to said counting means in response to rotation of said spool in the unwinding direction, said sensing means including means for sending a second signal to said counting means in response to rotation of said spool in the winding direction, said counting means including means for incrementing the number of revolutions of said spool in the belt unwinding direction in response to receiving said first signal, said counting means including means for decrementing the number of revolutions of said spool in the belt unwinding direction in response to receiving said second signal, said counting means including means for sending a third signal to said actuating means in response to said counting means counting the predetermined number of revolutions of said spool in the belt unwinding direction, said actuating means actuating said electrically actuatable mechanism to move said lever arm into engagement with said ratchet wheel in response to receiving said third signal from said counting means.

* * * * *